United States Patent
Chae et al.

(10) Patent No.: US 12,351,658 B2
(45) Date of Patent: Jul. 8, 2025

(54) POLYPROPYLENE RESIN, POLYPROPYLENE FIBER AND METHOD FOR PREPARING THE SAME

(71) Applicant: LG Chem, Ltd., Seoul (KR)

(72) Inventors: Seong Min Chae, Daejeon (KR); Hyunsup Lee, Daejeon (KR); Kyung Seop Noh, Daejeon (KR); Heekwang Park, Daejeon (KR); Jihwa Ye, Daejeon (KR)

(73) Assignee: LG Chem, Ltd., Seoul (KR)

( * ) Notice: Subject to any disclaimer, the term of this patent is extended or adjusted under 35 U.S.C. 154(b) by 716 days.

(21) Appl. No.: 17/435,136

(22) PCT Filed: Dec. 4, 2020

(86) PCT No.: PCT/KR2020/017652
§ 371 (c)(1),
(2) Date: Aug. 31, 2021

(87) PCT Pub. No.: WO2021/112623
PCT Pub. Date: Jun. 10, 2021

(65) Prior Publication Data
US 2022/0135715 A1    May 5, 2022

(30) Foreign Application Priority Data

Dec. 4, 2019   (KR) ................. 10-2019-0160109
Dec. 3, 2020   (KR) ................. 10-2020-0167775

(51) Int. Cl.
*C08F 110/06* (2006.01)
*C07F 17/00* (2006.01)
(Continued)

(52) U.S. Cl.
CPC ............ *C08F 110/06* (2013.01); *C07F 17/00* (2013.01); *D01D 5/08* (2013.01); *D01F 6/06* (2013.01); *C08F 2420/00* (2013.01)

(58) Field of Classification Search
CPC .... C08F 110/06; C08F 2500/24; C07F 17/00; D01D 5/08; D01F 6/06; C08L 23/12; C08L 2203/12
See application file for complete search history.

(56) References Cited

U.S. PATENT DOCUMENTS 5,213,881 A * 5/1993 Timmons ............... D04H 1/559
                                                 442/351
5,637,666 A   6/1997 Winter et al.
(Continued)

FOREIGN PATENT DOCUMENTS

CN    101415737 A    4/2009
CN    101896511 A    11/2010
(Continued)

OTHER PUBLICATIONS

Effect of Crystallinity on the Viscosity of an Isotactic Polypropylene; Roberto Pantani, Annarita De Meo, Vito Speranza, and Giuseppe Titomanlio; AIP Conf. Proc. 1695, 020065 (2015) (Year: 2015).*
(Continued)

*Primary Examiner* — Galen H Hauth
*Assistant Examiner* — John Robitaille
(74) *Attorney, Agent, or Firm* — Lerner David LLP

(57) ABSTRACT

The present disclosure relates to a polypropylene resin exhibiting excellent processability and capable of producing fine fibers, a polypropylene fiber including the same, and a method for preparing the same.

10 Claims, 1 Drawing Sheet

(51) Int. Cl.
    *D01D 5/08*         (2006.01)
    *D01F 6/06*         (2006.01)

(56) References Cited

U.S. PATENT DOCUMENTS

| | | |
|---|---|---|
| 2009/0017710 A1 | 1/2009 | Bugada et al. |
| 2011/0086568 A1 | 4/2011 | Standaert et al. |
| 2016/0108220 A1* | 4/2016 | Prokschi .................... C08J 5/18 |
| | | 525/240 |
| 2017/0198126 A1 | 7/2017 | Wang et al. |
| 2017/0320986 A1 | 11/2017 | Braun et al. |
| 2018/0251584 A1 | 9/2018 | Cho et al. |
| 2019/0390046 A1* | 12/2019 | Monzo .................. B29C 48/022 |
| 2020/0140583 A1 | 5/2020 | Kim et al. |
| 2021/0388178 A1 | 12/2021 | Noh et al. |
| 2023/0257494 A1 | 8/2023 | Chae et al. |

FOREIGN PATENT DOCUMENTS

| | | |
|---|---|---|
| CN | 103834097 A | 6/2014 |
| CN | 103834097 B | 6/2016 |
| CN | 110099934 A | 8/2019 |
| EP | 3868821 A1 | 8/2021 |
| EP | 4155327 A1 | 3/2023 |
| JP | 2000290416 A | 10/2000 |
| JP | 2007-145914 A | 6/2007 |
| JP | 2017532422 A | 11/2017 |
| JP | 6340091 B2 | 6/2018 |
| KR | 100329444 B1 | 9/2002 |
| KR | 100581761 B1 | 5/2006 |
| KR | 20090119007 A | 11/2009 |
| KR | 101364329 B1 | 2/2014 |
| KR | 20140069576 A | 6/2014 |
| KR | 101950462 B1 | 2/2019 |
| KR | 20190062163 A | 6/2019 |
| WO | 2022-055234 A1 | 3/2022 |

OTHER PUBLICATIONS

"Rheological properties of polypropylene during multiple extrusion"; Helson M. da Costa*, ValeA'ria D. Ramos, Marisa C.G. Rocha; Polymer Testing 24 (2005) 86â93 (Year: 2005).*

Bresee, R. et al., "Influence of Processing Conditions on Melt Blown Web Structure: Part 1-DCD," International Nonwovens Journal, Mar. 2004, pp. 49-55, INJ Spring.

International Search Report for Application No. PCT/KR2020/017652 mailed Mar. 15, 2021, pp. 1-5.

Extended European Search Report and European Search Report for Application No. 20896413.0 dated Feb. 25, 2022, 7 pgs.

Search Report dated Oct. 30, 2022 from Office Action for Chinese Application No. 202080016448.6 issued Nov. 3, 2022. 2 pgs.

\* cited by examiner

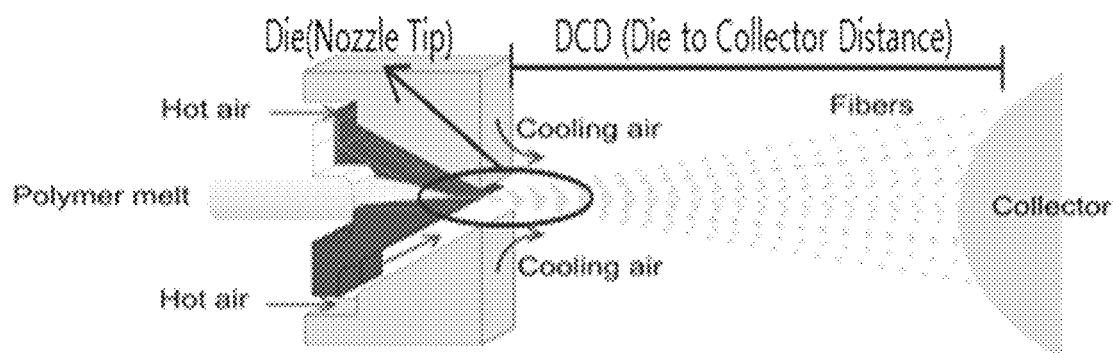

POLYPROPYLENE RESIN, POLYPROPYLENE FIBER AND METHOD FOR PREPARING THE SAME

CROSS-REFERENCE TO RELATED APPLICATION(S)

The present application is a national stage entry under 35 U.S.C. § 371 of International Application No. PCT/KR2020/017652 filed on Dec. 4, 2020, which claims priority from Korean Patent Applications No. 10-2019-0160109 filed on Dec. 4, 2019, and No. 10-2020-0167775 filed on Dec. 3, 2020, the disclosure of which is incorporated herein by reference.

BACKGROUND OF THE INVENTION

(a) Field of the Invention

The present disclosure relates to a polypropylene resin exhibiting excellent processability and capable of producing fine fibers, a polypropylene fiber including the same, and a method for preparing the same.

(b) Description of the Related Art

Polypropylene resins have been conventionally used as a general-purpose resin in various fields due to its low specific gravity, high heat resistance, and excellent processability and chemical resistance.

Polypropylene resins have also been used in various ways in the automobile industry, and fibers manufactured by a melt blown method have also been applied as sound absorbing materials for automobiles. Typically, high-fluidity polypropylene with a melt index (MI) of 1500 or more is widely used for melt blown fibers. In the textile industry, various studies, for example, applying homopolypropylene with an increased MI or controlling spinning conditions such as hot air temperature/pressure are underway in order to improve sound-absorbing properties by increasing the production of fine fibers when applied to a final product, the sound-absorbing material.

Ultra-high-fluidity homopolypropylene manufactured using a general-purpose Ziegler-Natta catalyst can produce high-fluidity products with an increased MI compared to the related art by using a peroxide-based decomposition accelerator in the process of extruding a low-MI material with a vis-breaking or Controlled Rheology (CR) process due to its low hydrogen reactivity. However, due to the limitation of the catalyst having multiple active points and the limitation of the CR process, the molecular weight distribution exceeds 3, which makes it difficult to increase the production of fine fibers when applied to fiber applications.

In addition, an excessive amount of peroxide is used in order to increase the MI compared to the related art, so that excessive Hume is generated during the melt blown processing, resulting in a decrease in processability during the spinning process and an environmental problem due to high total volatile organic compounds (TVOC).

Accordingly, there has been an attempt to apply a homopolypropylene with an increased MI compared to a conventional high-fluidity polypropylene to a melt blown method based on a metallocene catalyst capable of achieving ultra-high-fluidity and narrow molecular weight distribution without using peroxide. However, in the case of changing the spinning conditions for producing fine fibers (increasing hot air temperature and pressure) or applying a product with a MI of 1800 or more, there was a limitation in the production of ultrafine fibers due to the occurrence of Fly during the spinning process. Accordingly, it was impossible to produce a sound-absorbing material in which novel ultrafine fibers were distributed, and there was a problem in that a sound-absorbing effect in a high-frequency region required for electric vehicles and the like was deteriorated.

Accordingly, it is necessary to develop a resin satisfying all of the eco-friendliness, processability, and fineness required for the product.

SUMMARY OF THE INVENTION

Technical Problem

The present disclosure relates to a polypropylene resin exhibiting excellent processability and capable of producing fine fibers, a polypropylene fiber including the same, and a method for preparing the same.

Technical Solution

In order to solve the above problems, there is provided a polypropylene resin including a homopolypropylene polymer and meeting the following conditions of i) to iii):
  i) an average particle diameter is 1,200 μm to 2,500 μm,
  ii) a melt index measured at 230° C. with a load of 2.16 kg in accordance with ASTM D1238 is 1,700 g/10 min to 3,500 g/10 min, and
  iii) a crystallization on set temperature ($T_1$) is 127° C. or more, wherein the crystallization on set temperature ($T_1$) is an initial temperature at a point where a viscosity change ratio represented by the following Equation 1 is 190 or more, $$\text{Viscosity change ratio} = V_2(T_2)/V_1(T_1) \quad \text{[Equation 1]}$$

In Equation, $V_1(T_1)$ and $V_2(T_2)$ are complex viscosities (Pa·s) measured at $T_1$ and $T_2$, respectively, while reducing the temperature of a polypropylene resin from 180° C. at 1° C./min under a shear rate of 1 s$^{-1}$, $T_1$ is a crystallization on set temperature, and $T_2$ is a temperature 3° C. lower than the crystallization on set temperature ($T_1$).

According to another embodiment of the present disclosure, there is provided a polypropylene fiber including the above-described polypropylene resin.

According to another embodiment of the present disclosure, there is provided a method for preparing a polypropylene fiber including the above-described polypropylene resin.

Specifically, it includes the steps of: preparing a polypropylene resin including a homopolypropylene polymer by polymerizing propylene monomers in the presence of a catalyst composition containing a transition metal compound represented by the following Chemical Formula 1, a silica support, and an alkylaluminoxane-based cocatalyst while introducing hydrogen in an amount of 1,000 ppm to 2,000 ppm, and preparing a fiber by melt spinning the polypropylene resin while injecting air at 240° C. to 270° C. under a pressure of 1.8 psi to 2.3 psi, wherein the polypropylene resin meets the following conditions of i) to iii):
  i) an average particle diameter is 1,200 μm to 2,500 μm,
  ii) a melt index measured at 230° C. with a load of 2.16 kg in accordance with ASTM D1238 is 1,700 g/10 min to 3,500 g/10 min, and iii) a crystallization on set temperature ($T_1$) is 127° C. or more, wherein the crystallization on set temperature ($T_1$) is an initial temperature at a point where a viscosity change ratio represented by the following Equation 1 is 190 or more, Viscosity change ratio=$V_2(T_2)/V_1(T_1)$ [Equation 1]

In Equation, $V_1(T_1)$ and $V_2(T_2)$ are complex viscosities (Pa·s) measured at $T_1$ and $T_2$, respectively, while reducing the temperature of a polypropylene resin from 180° C. at 1° C./min under a shear rate of 1 s$^{-1}$, $T_1$ is a crystallization on set temperature, and $T_2$ is a temperature 3° C. lower than the crystallization on set temperature ($T_1$).

[Chemical Formula 1]

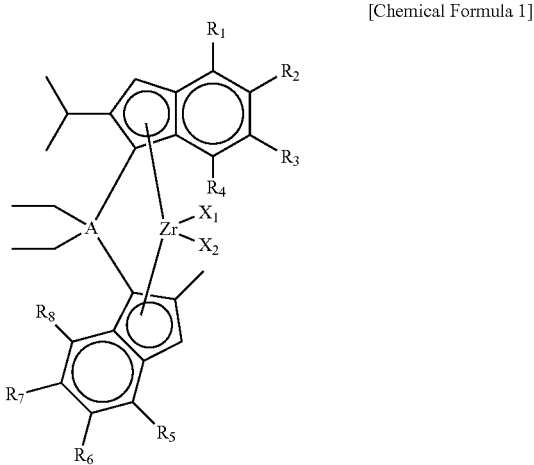

in Chemical Formula 1, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and A is carbon, silicon or germanium.

Advantageous Effects

The polypropylene resin composition according to the present disclosure satisfies a specific crystallization behavior parameter, thereby remarkably reducing the occurrence of FLY in the fiberization process, facilitating the production of fine fibers, and at the same time remarkably improving productivity.

BRIEF DESCRIPTION OF THE DRAWINGS

The FIGURE is a schematic diagram illustrating a melt blown spinning process.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the polypropylene resin, the fiber including the same, and the method for preparing the same according to specific embodiments of the present disclosure will be described in more detail.

Since it is difficult to make products with a melt index (MI) of 1,800 g/10 min or more among commonly used metallocene polypropylene resins for melt blown in pellets due to their low viscosity, so they are produced in powder or flake-type. However, the powder-type polypropylene resin had a problem of deteriorating spinning stability such as unstable raw material input and small feeding amount during melt blown spinning, due to its small particle size. In addition, when changing spinning conditions for producing fine fibers (increasing hot air temperature and pressure), there was a problem in that it was difficult to produce ultrafine fibers due to the occurrence of Fly during the spinning process.

Accordingly, the present inventors have confirmed that a high-fluidity polypropylene resin having a large particle size could be polymerized by using a metallocene-based compound with a specific chemical formula exhibiting high hydrogen reactivity during polymerization of a polypropylene resin, and controlling the amount of hydrogen input to a specific range. In particular, when the resin satisfying specific properties is manufactured into a fiber, the viscosity increases rapidly at a relatively high temperature in a die to collector distance between an extrusion die and a collector during the spinning process. As a result, it was confirmed that the FLY phenomenon of fibers generated by high-pressure air during the process was significantly reduced, and the present disclosure was completed by deriving specific crystallization behavior parameters related to the complex viscosity according to temperature reduction.

By using this, the occurrence of FLY in the spinning process is remarkably reduced during fiberization, thereby facilitating the production of fine fibers, and at the same time remarkably improving productivity.

In the present disclosure, "powder" or "powder-type" refers to small particles or pieces formed without an extrusion process of raw materials, and includes all forms classified as powders in the art such as a spherical shape, a flat-plate shape, a scale shape, a polygonal shape, and a rod shape. The size is appropriately determined according to the use and shape, and is not particularly limited, but generally has a small average particle size of 1 mm. In addition, the pellet formed by the extrusion process of raw materials and the powder formed without the extrusion process can be classified based on bulk density, average diameter, or the like. Considering the definition of pellets in the art as having an average particle diameter (or diameter) of 2 mm or more, or 3 mm or more and 200 mm or less, 100 mm or less, or 5 mm or less, and a bulk density of 0.6 g/ml or less, more specifically 0.35 g/ml to 0.6 g/ml, the present disclosure defines the powder as having an average particle diameter (or diameter) of less than 2 mm, more specifically 1.5 mm or less, or 1 mm or less, and more than 0 mm. At this time, the "particle diameter or diameter" is the longest distance among any linear distances on an outer peripheral surface of the powder, and can be measured using an image microscope or the like.

In the present disclosure, "ultrafine fiber" is a fiber of about 2.0 μm or less (preferably about 1.3 μm or less, about 1.0 μm or less), and may mean that it is easily applied to a sound absorbing material or the like. In addition, spinning stability means that no FLY (resin flying) or NEP (small lumps of fibers) is generated by the high temperature or high pressure of air used in the spinning process, and the overall shape of meltblown web and the diameter of the fiber are uniform. In addition, fiber processability may mean that a fiber having a finer shape and high tenacity is produced when a drawing process is performed during processing by enabling the drawing at a high ratio due to a uniform molecular weight distribution.

Polypropylene Resin

The polypropylene resin according to an embodiment of the present disclosure includes a homopolypropylene polymer and meets the following conditions of i) to iii):
  i) an average particle diameter is 1,200 μm to 2,500 μm,
  ii) a melt index measured at 230° C. with a load of 2.16 kg in accordance with ASTM D1238 is 1,700 g/10 min to 3,500 g/10 min, and
  iii) a crystallization on set temperature ($T_1$) is 127° C. or more.

The polypropylene resin is in a powder form and satisfies an average particle diameter (D50) of about 1,200 μm to 2,500 μm, thereby achieving excellent spinning stability, and at the same time, it satisfies a high melt index and a specific crystallization on set temperature, thereby exhibiting a unique crystallization behavior in the spinning process. Accordingly, it is suitable for providing ultrafine fibers without the FLY phenomenon, and fiber processability is also excellent.

The particle diameter of the polypropylene resin represents the average particle diameter (D50) of the longest diameter of each particle, and the average particle diameter (D50) represents the particle size or particle diameter at 50% of a cumulative distribution of the number of particles according to the particle size.

The particle size of the polypropylene resin is measured using a laser diffraction particle size analyzer (HELOS™ from Symatec). Specifically, after a sample was injected into a hopper of the laser diffraction particle size analyzer, a particle size distribution was measured in the range of 18 μm to 3,500 μm, and the average particle size (D50) was calculated using the result.

When the average particle diameter of the polypropylene resin is out of the above range, there is a problem that it is difficult to make the polypropylene resin into ultrafine fibers. Preferably, the average particle diameter may be about 1,500 μm to 2,500 μm, about 1,500 μm to 2,300 μm, about 1,800 μm to 2,300 μm, 1,800 μm to 2,500 μm, 2,000 μm to 2,500 μm, or 2,000 μm to 2,300 μm. Within the above range, production of ultrafine fibers, spinning stability and fiber processability may be further improved.

The polypropylene resin has a melt index (MI) measured at 230° C. with a load of 2.16 kg in accordance with ASTM D1238 of 1,700 g/10 min to 3,500 g/10 min, which indicates high fluidity.

In the case of using a high-fluidity resin having a melt index of about 1,800 g/10 min among existing available products, the FLY phenomenon inevitably occurs in the spinning process, and thus it is difficult to provide ultrafine fibers. However, the resin of the present disclosure has a high melt index of 1,700 g/10 min to 3,500 g/10 min, and at the same time satisfies the specific average particle diameter and the crystallization on set temperature, thereby exhibiting a unique crystallization behavior in the spinning process. Accordingly, it is suitable for providing ultrafine fibers without the FLY phenomenon.

The melt index (MI) is measured at 230° C. with a load of 2.16 kg in accordance with the American Society for Testing and Materials standard, ASTM D1238. In general, the melt index can be adjusted by controlling the amount of hydrogen input during the polymerization process, and when using a Ziegler-Natta catalyst in the related art, a large amount of hydrogen should be added in the polymerization step. However, the present disclosure exhibits excellent catalytic activity even with a decrease in the amount of hydrogen input due to high hydrogen reactivity, and a homopolypropylene polymer having high fluidity and a relatively large size can be prepared by controlling the amount of hydrogen together with the metallocene compound of Chemical Formula 1 to be described later capable of preparing a low molecular weight polymer due to steric hindrance by a substituent bonded to a ligand, specifically an isopropyl group within a specific range. Accordingly, it is suitable for providing ultrafine fibers.

When the melt index of the polypropylene resin is 1,700 g/10 min or less, the average diameter of fibers increases, making it difficult to form fine fibers, and when it exceeds 3,500 g/10 min, there is a problem that spinning stability is deteriorated. Preferably, the melt index may be 1,800 g/10 min to 3,400 g/10 min, 2,000 g/10 min to 3,400 g/10 min, or 2,200 g/10 min to 3,350 g/10 min. Within the above range, production of fine fibers, spinning stability, and fiber processability may be further improved.

The polypropylene resin has a crystallization on set temperature ($T_1$) of 127° C. or more. The crystallization on set temperature ($T_1$) is an initial temperature at a point where a viscosity change ratio represented by the following Equation 1 is 190 or more, and this is an initial temperature in the section where the viscosity increases rapidly with the temperature reduction after melting:

$$\text{Viscosity change ratio} = V_2(T_2)/V_1(T_1) \quad \text{[Equation 1]}$$

In Equation, $V_1(T_1)$ and $V_2(T_2)$ are complex viscosities (Pa·s) measured at $T_1$ and $T_2$, respectively, while reducing the temperature of a polypropylene resin from 180° C. at 1° C./min under a shear rate of 1 s$^{-1}$,
  $T_1$ is a crystallization on set temperature, and
  $T_2$ is a temperature 3° C. lower than the crystallization on set temperature ($T_1$).

Specifically, the crystallization on set temperature ($T_1$) refers to an initial temperature at a point where a viscosity increases rapidly within a die to collector distance between an extrusion die and a collector in a spinning process for manufacturing the polypropylene resin into a fiber. In the present disclosure, the viscosity increases rapidly at a relatively high temperature of 127° C. or more as described above, so that the FLY phenomenon in the spinning process can be remarkably reduced, thereby making it easy to produce fine fibers.

The viscosity change ratio calculated according to Equation 1 is a crystallization behavior parameter derived by measuring complex viscosities at the corresponding temperatures while reducing the temperature of the polypropylene resin from 180° C. at 1° C./min under a constant shear rate of 1 s$^{-1}$.

In the present disclosure, the complex viscosity is measured using ARES (advanced rheometric expansion system).

The viscosity change ratio parameter of Equation 1 is an index indicating the degree of change in complex viscosity of the resin in the DCD (die to collector distance, spinning distance) section in the spinning process during fiber production. Herein, V$_1$(T$_1$) is a complex viscosity measured at a crystallization on set temperature (T$_1$), and V$_2$(T$_2$) is a complex viscosity measured at a temperature (T$_2$) 3° C. lower than the crystallization on set temperature (T$_1$). In addition, 190 or more of the viscosity change ratio means that the complex viscosity is remarkably increased by about 190 times in a section where there is a difference of about 3° C. under a reduced temperature condition.

When the crystallization on set temperature (T$_1$) of the polypropylene resin is less than 127° C., severely controlling the process conditions (increasing pressure, temperature) in order to provide ultrafine fiber inevitably causes a problem of FLY or NEP (small lumps of fibers) in the spinning process. Preferably, the crystallization on set temperature (T$_1$) of the polypropylene resin may be 127° C. to 130° C. or 128° C. to 130° C. Within the above range, production of ultrafine fibers, spinning stability, and fiber processability may be further improved. On the other hand, when the crystallization on set temperature (T$_1$) is 130° C. or more, it may be difficult to obtain ultrafine fibers due to rapid solidification.

Meanwhile, a viscosity change ratio (=V'$_2$(T$_2$)/V'$_1$(T$_1$)) of a viscosity V'$_2$(T$_2$) measured at a temperature 3° C. lower than a crystallization on set temperature (T$_1$) to a viscosity V'$_1$(T$_1$) measured at the crystallization on set temperature (T$_1$) derived according to Equation 1 is 220 to 450. Within the above range, production of ultrafine fibers, spinning stability, and fiber processability may be further improved.

The complex viscosity V$_2$(T$_2$) measured at a temperature (T$_2$) 3° C. lower than the crystallization on set temperature (T$_1$) may be 8,300 Pa·s to 20,000 Pa·s. Within the above range, production of ultrafine fibers, spinning stability, and fiber processability may be further improved.

The crystallization on set temperature of the polypropylene resin is 127° C. or more. At a temperature of 127° C. or less under reduced temperature conditions, crystallization proceeds and the viscosity increases rapidly. Accordingly, the polypropylene resin may have a complex viscosity measured at 126° C. of 500 Pa·s or more. In addition, the complex viscosity measured at 125° C. may be 8,000 Pa·s or more.

The polypropylene resin may have a high melting point (Tm) of 155° C. or more. By having such a high melting point, high stereoregularity can be obtained, and as a result, excellent heat resistance can be exhibited. When the melting point is less than 155° C., heat resistance deteriorates, and there is a risk of decomposition by heat during fiber processing at high temperatures. More specifically, the melting point of the homopolypropylene resin is 156° C. or more. In consideration of excellent thermal stability along with sufficient processability required for injection molding and fiber processing, the melting point may be 170° C. or less, or 160° C. or less.

Meanwhile, the temperature of the resin is increased to 200° C., and maintained at that temperature for 5 minutes. After that, the temperature is lowered to 30° C., and further increased. The temperature at the top of the DSC (Differential Scanning calorimeter, manufactured by TA) curve is referred to as the melting point. Herein, the temperature is increased and lowered at a rate of 10° C./min, respectively, and the melting point is confirmed at the second heating period.

The polypropylene resin may exhibit a molecular weight distribution (MWD) of 2.2 to 2.4. By having such a narrow molecular weight distribution, excellent spinning stability and excellent fiber processability are exhibited, and thus fine fibers can be provided.

Meanwhile, the molecular weight distribution (MWD) may be measured using gel permeation chromatography (GPC). The molecular weight distribution may be determined by measuring the weight average molecular weight (Mw) and the number average molecular weight (Mn), and then calculating a ratio of the weight average molecular weight to the number average molecular weight (Mw/Mn). Specifically, it can be measured using PL-GPC220 instrument manufactured by Waters as a gel permeation chromatography (GPC) device, and a Polymer Laboratories PLgel MIX-B 300 mm long column. At this time, a measurement temperature is 160° C., 1,2,4-trichlorobenzene is used for a solvent and a flow rate is 1 mL/min. And the resin sample with a concentration of 10 mg/10 mL is supplied in an amount of 200 µL. Mw and Mn are obtained using a calibration curve formed using a polystyrene standard. 9 kinds of the polystyrene standard are used with the molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol.

The polypropylene resin according to an embodiment of the present disclosure may be used in combination with other additives within a range that does not affect the desired physical properties, and specifically, may be used in combination with an antioxidant or the like.

The antioxidant is a component that is added to prevent changes in physical properties due to heat and shear stress applied during the processing of the resin. In the process of processing the polyethylene resin into fibers, a breakage of chain or a cross-linking reaction may occur in the resin due to thermal decomposition by a radical mechanism due to heat, shear stress, etc. As a result of this, there is a possibility that physical properties of the resin may change, such as a decrease in viscosity, and the antioxidant is used to prevent such changes in physical properties.

Examples of the antioxidant may include octadecyl-3-[3,5-di-tert-butyl-4-hydroxyphenyl] propionate, 1,3,5-tris(3,5-di-tert-butyl-4-hydroxybenzyl)-1,3,5-triazine-2,4,6-(1H,3H,5H)-trione, 1,3,5-tris(4-tert-butyl-3-hydroxy-2,6-dimethylbenzyl)-1,3,5-triazine-2,4,6-(1H,3H,5H)-trione, and the like, and any one or a mixture of two or more thereof may be used. Moreover, it is also possible to use Irganox® 3114 (manufactured by BASF), Irganox® 1076, 1010, 3114 (manufactured by BASF), or Cyanox® 1790 (manufactured by CYTEC), which satisfies the above structural characteristics and is commercially available.

The antioxidant may be included in an amount of 0.1 to 3.0 parts by weight based on 100 parts by weight of the polypropylene resin. If the content of the antioxidant is less than 0.1 parts by weight, the improvement effect by the antioxidant is insignificant, and if it exceeds 3.0 parts by weight, there is a fear of a decrease in viscosity and discoloration due to an excessive amount of the antioxidant. Preferably, it may be 0.05 parts by weight or more, or 1 parts by weight or more.

In an embodiment of the present disclosure, the polypropylene resin may further include at least one additive such as a neutralizing agent, a slip agent, an anti-blocking agent, a UV stabilizer, and an antistatic agent, in addition to the above components. The content of the additive is not particularly limited, and as an example, each additive may be used in an amount of 500 ppm or more, or 700 ppm or more, and 2500 ppm or less, or 1500 ppm or less, based on the total weight of the polypropylene resin.

Polypropylene Fiber

In addition, according to another embodiment of the present disclosure, there is provided a polypropylene fiber including the polypropylene resin.

As described above, the polypropylene resin includes a homopolypropylene polymer, and simultaneously satisfies i) a relatively large average particle diameter, ii) high fluidity, and iii) a specific crystallization behavior according to temperature reduction. Accordingly, when the polypropylene resin is manufactured into fibers, excellent spinning stability and excellent fiber processability are exhibited, and thus it is possible to make ultrafine fibers.

The polypropylene resin is in powder form.

A fiber according to an embodiment of the present disclosure is prepared by a melt blown process using the polypropylene resin, and a resin satisfying the above-described specific physical properties is specifically used. In the process of spinning while reducing the temperature after melting, the viscosity increases rapidly at a relatively high temperature (crystallization on set temperature is 127° C. or more), and thus a FLY phenomenon of fibers generated by high-pressure air in a die to collector distance between an extrusion die and a collector is significantly reduced. Accordingly, it was confirmed that spinning stability is improved, thereby facilitating the production of fine fibers, and remarkably improving fiber processability.

A fiber prepared according to the above method has an average diameter of about 2.0 μm or less, preferably about 0.0001 μm to 2.0 μm, about 0.01 μm to 2.0 μm, about 0.01 μm to 1.3 μm, or about 0.01 μm to 1.0 μm or less. Ultrafine fibers within the above range can be applied to various fields, and can be used as a sound-absorbing material to achieve an excellent sound-absorbing effect, and in particular, can achieve an excellent sound-absorbing effect even in a high frequency range.

The average diameter of the fiber refers to a diameter of a vertical cross section with respect to a long side of the fiber, and in this case, the diameter of the fiber may be defined as the longest distance among linear distances connecting any two points of a cross section of the fiber. Specifically, about 400 fibers were sampled through a scanning electron microscope (SEM), and an arithmetic mean value of their diameters was calculated.

Method for Preparing Polypropylene Fiber

Meanwhile, according to another embodiment of the present disclosure, there is provided a method for preparing a polypropylene fiber using the polypropylene resin.

Hereinafter, each step will be described in detail.

(Step 1)

A step of preparing a polypropylene resin including a homopolypropylene polymer by polymerizing propylene monomers in the presence of a catalyst composition containing a transition metal compound represented by the following Chemical Formula 1, a silica support, and an alkylaluminoxane-based cocatalyst while introducing hydrogen in an amount of 1,000 ppm to 2,000 ppm is included.

The polypropylene resin satisfies the above-described i) relatively large average particle diameter, ii) high fluidity, and iii) specific crystallization behavior according to temperature reduction, and all the above-described descriptions are applied. The prepared polypropylene resin is in powder form.

Specifically, the homopolypropylene polymer is prepared by a polymerization process in which a catalyst composition containing the above-described components and propylene monomers are contacted in the presence of hydrogen gas.

At this time, the hydrogen gas functions to control the molecular weight by activating inert sites of the metallocene catalyst and causing a chain transfer reaction. The metallocene compound of the present disclosure has excellent hydrogen reactivity, and therefore, adjusting the amount of hydrogen gas used in the polymerization process to 1,000 ppm to 2,000 ppm can prepare a polypropylene resin satisfying the above-described i) relatively large average particle diameter, ii) high fluidity, and iii) specific crystallization behavior according to temperature reduction.

Preferably, the hydrogen may be introduced in an amount of 1,200 ppm to 1,800 ppm, or 1,200 ppm to 1,600 ppm. It is preferable to form a polypropylene resin satisfying the above-described specific physical properties within the above range.

The structure of the transition metal compound may be represented by the following Chemical Formula 1:

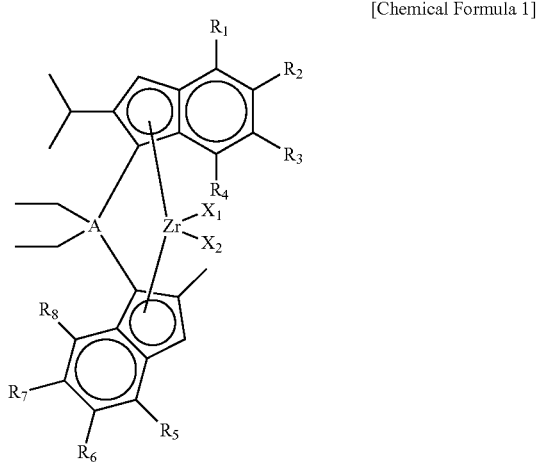

[Chemical Formula 1]

in Chemical Formula 1, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and A is carbon, silicon or germanium.

Unless otherwise specified herein, following terms may be defined as follows.

The halogen may be fluorine (F), chlorine (Cl), bromine (Br) or iodine (I).

The $C_{1-20}$ alkyl group may be a linear, branched or cyclic alkyl group. Specifically, the $C_{1-20}$ alkyl group may be a $C_{1-15}$ linear alkyl group; a $C_{1-40}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group or the like.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may be a monocyclic, bicyclic or tricyclic aromatic hydrocarbon. Specifically, the $C_{6-30}$ aryl may be phenyl, naphthyl, anthracenyl, or the like.

The $C_{7-30}$ alkylaryl may include a substituent in which at least one hydrogen of the aryl is substituted with alkyl. Specifically, the $C_{7-30}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-30}$ arylalkyl may include a substituent in which at least one hydrogen of the alkyl is substituted with aryl. Specifically, the $C_{7-30}$ arylalkyl may be benzyl, phenylpropyl or phenylhexyl.

In the above preparation method, the catalyst composition contains the compound of Chemical Formula 1 as a single catalyst. Accordingly, the molecular weight distribution of the prepared polypropylene resin may be narrowed compared to the case of using a mixture of two or more types of catalysts in the related art.

Furthermore, the compound of Chemical Formula 1 includes a divalent functional group A disubstituted with ethyl groups as a bridge group connecting two ligands including an indenyl group. As a result, it has an increased size of atom compared to the existing carbon bridge and an increased usable angle, so that monomers may easily approach thereto, resulting in better catalytic activity. In addition, the two ethyl groups bonded to A can increase solubility to improve a supporting efficiency, and the problem of poor supporting reactivity due to poor solubility in the preparation of a supported catalyst when a methyl group is included as a substituent of the existing bridge can be solved.

In addition, since the position 2 of the two indenyl groups, which are ligands, is substituted with a methyl group and an isopropyl group, respectively, it is possible to prepare a low molecular weight polymer due to an appropriate steric hindrance. Further, since both of the two indenyl ligands include an aryl group in which the position 4 ($R_1$ and $R_5$) is substituted with alkyl, more excellent catalytic activity can be exhibited by an inductive effect capable of supplying sufficient electrons. As a result, by forming a long chain branched structure (LCB) in the structure of homopolypropylene at an appropriate ratio/distribution, a homopolypropylene having high fluidity can be prepared.

In addition, the compound of Chemical Formula 1 contains zirconium (Zr) as a central metal, it may have more orbitals capable of accepting electrons compared to the case of containing another Group 14 element such as Hf. Accordingly, it can be easily bonded to monomers with more affinity, resulting in much improved catalytic activity.

More specifically, in Chemical Formula 1, $R_1$ and $R_5$ may each independently be a $C_{6-12}$ aryl group substituted with $C_{1-10}$ alkyl, and more specifically, a phenyl group substituted with a $C_{3-6}$ branched alkyl group such as tert-butyl phenyl. In addition, the substitution position of the alkyl group with respect to the phenyl group may be the position 4 corresponding to a para-position with respect to $R_1$ or $R_5$ bonded to the indenyl group.

In addition, in Chemical Formula 1, $R_2$ to $R_4$ and $R_6$ to $R_8$ may each independently be hydrogen, $X_1$ and $X_2$ may each independently be chloro, and A may be silicone.

A representative example of the compound represented by Chemical Formula 1 is as follows:

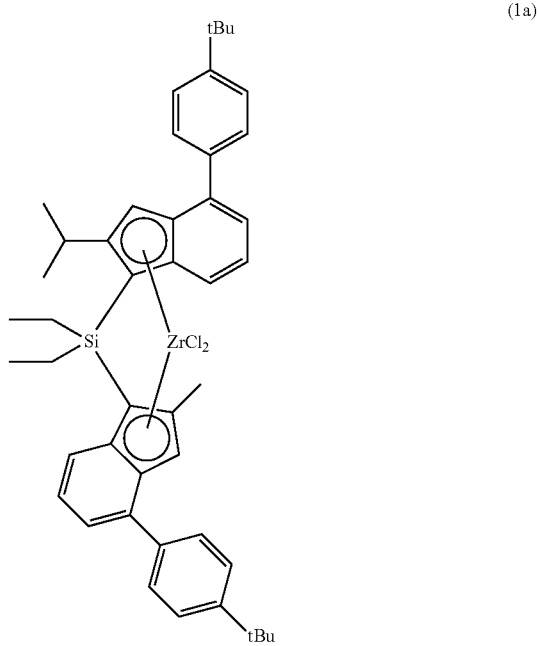

(1a)

The compound of Chemical Formula 1 may be synthesized by applying known reactions, and the synthesis method can be referred to Preparation Example to be described later.

Meanwhile, the compound of Chemical Formula 1 is used as a supported catalyst supported on a silica support.

When used as a supported catalyst, the polymer to be prepared has excellent particle shape and bulk density, and can be suitably used in a conventional slurry polymerization, bulk polymerization, or gas phase polymerization process.

The silica support may include a highly reactive hydroxyl group and a siloxane group on the surface, and may be dried at a high temperature to remove moisture from the surface. For example, the silica support may be silica, silica-alumina, silica-magnesia, or the like, and it may usually contain oxides, carbonates, sulfates, or nitrates such as $Na_2O$, $K_2CO_3$, $BaSO_4$, $Mg(NO_3)_2$ and the like. When the silica support is used, the functional groups of the metallocene compound are chemically bonded and supported, and thus there is almost no catalyst released from the surface of the support in the propylene polymerization process. As a result, when preparing a polypropylene resin by slurry or gas phase polymerization, a fouling phenomenon, sticking to the wall surface of the reactor or with each other, may be minimized.

When the compound of Chemical Formula 1 is supported on a silica support, the compound of Chemical Formula 1 may be supported in an amount of 40 pmol or more, or 80 pmol or more, and 240 pmol or less, or 160 pmol or less based on 1 g of silica. When supported within the above content range, the supported catalyst may exhibit appropriate activity, which is advantageous in terms of maintaining catalytic activity and economical efficiency.

In addition, the catalyst composition may further include a cocatalyst in terms of improving the high activity and stability.

The alkylaluminoxane-based cocatalyst may include at least one selected from a compound represented by Chemical Formula 2, a compound represented by Chemical Formula 3, and a compound represented by Chemical Formula 4:

$$-[Al(R_{11})-O]_m-\quad\quad\text{[Chemical Formula 2]}$$

in Chemical Formula 2,
$R_{11}$ are the same as or different from each other, and each independently halogen; a $C_{1-20}$ hydrocarbon; or a $C_{1-20}$ halogen-substituted hydrocarbon; and
m is an integer of 2 or more;

$$J(R_{12})_3\quad\quad\text{[Chemical Formula 3]}$$

in Chemical Formula 3,
$R_{12}$ are the same as or different from each other, and each independently halogen; a $C_{1-20}$ hydrocarbon; or a $C_{1-20}$ halogen-substituted hydrocarbon; and
J is aluminum or boron;

$$[E-H]^+[ZD_4]^-\text{ or }[E]^+[ZD_4]^-\quad\quad\text{[Chemical Formula 4]}$$

in Chemical Formula 4,
E is a neutral or cationic Lewis base;
H is a hydrogen atom;
Z is a Group 13 element; and
D are the same as or different from each other, and each independently a $C_{6-20}$ aryl or $C_{1-20}$ alkyl group, of which one or more hydrogen atoms are substituted or unsubstituted with halogen, a $C_{1-20}$ hydrocarbon, alkoxy, or phenoxy.

Examples of the compound represented by Chemical Formula 2 may include an alkylaluminoxane-based compound such as methylaluminoxane, ethylaluminoxane, isobutylaluminoxane, or butylaluminoxane, and any one or a mixture thereof may be used.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and any one or a mixture thereof may be used.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

Among the above compounds, the cocatalyst may be more specifically an alkylaluminoxane-based cocatalyst such as methylaluminoxane.

The alkylaluminoxane-based cocatalyst stabilizes the transition metal compound of Chemical Formula 1 and acts as a Lewis acid, so that further enhances catalytic activity by including a metal element capable of forming a bond with a functional group introduced into a bridge group of the transition metal compound of Chemical Formula 1 through a Lewis acid-base interaction.

In addition, the content of the cocatalyst may be appropriately adjusted depending on the desired properties or effects of the catalyst and the resin composition. For example, when using silica as the support, the cocatalyst may be supported in an amount of 8 mmol or more, or 10 mmol or more, and 25 mmol or less, or 20 mmol or less based on a weight of the support, for example, 1 g of silica.

The catalyst composition having the above components may be prepared by a preparation method including the steps of supporting a cocatalyst compound on a support, and supporting a transition metal compound represented by Chemical Formula 1 on the support. At this time, a supporting order of the cocatalyst and the transition metal compound represented by Chemical Formula 1 may be changed, if necessary. In consideration of the effect of the supported catalyst having a structure determined according to the supporting order, supporting the transition metal compound after supporting the cocatalyst on the support can achieve higher catalytic activity and better process stability in the preparation of polypropylene.

In addition, the catalyst composition described above may be used by itself for polymerization, or may be used in a prepolymerized state through contact with propylene monomers before the use in a polymerization reaction. In this case, the preparation method according to an embodiment of the present disclosure may further include a step of prepolymerizing by contacting the catalyst composition with propylene monomers before preparing a homopolypropylene through a polymerization reaction.

In general, when using a highly active supported catalyst, polymerization occurs first on a surface of the support, and the resulting polymer crystallizes to inhibit monomer diffusion to form a hollow polymer, resulting in a decrease in bulk density. On the other hand, the present disclosure performs the prepolymerization at low temperatures, so that a diffusion rate of the monomer into the support can be adjusted, and as a result, morphology of the polymer can be easily controlled and improved.

In addition, the polymerization reaction of the homopolypropylene polymer may be carried out in a continuous polymerization process, for example, in various polymerization processes known as polymerization reactions of olefin monomers such as a solution polymerization process, a slurry polymerization process, a suspension polymerization process, or an emulsion polymerization process. In particular, in consideration of realizing narrow molecular weight distribution and high fluidity of the polypropylene resin to be prepared, and commercialization of the product, a continuous bulk slurry polymerization process in which a catalyst, propylene monomers and optionally hydrogen gas are continuously introduced may be applied. For example, in the present disclosure, it may be carried out in a spheripol process using a loop reactor.

In addition, the polymerization reaction may be performed at 40° C. or more, 60° C. or more, or 70° C. or more, and 110° C. or less, or 100° C. or less, and under a pressure of 1 kgf/cm$^2$ or more, or 5 kgf/cm$^2$ or more, and 100 kgf/cm$^2$ or less, or 50 kgf/cm$^2$ or less. The polymerization proceeds under such a temperature and pressure, so that a homopolypropylene having desired high fluidity can be prepared at high yield.

In addition, in the polymerization reaction, the catalyst composition may be used in the form of a mud catalyst mixed in a mixture of oil and grease. In this case, the amount of volatile organic compounds contained in the prepared resin is significantly reduced compared to the conventional case where the catalyst composition is dissolved or diluted in an aliphatic hydrocarbon solvent having 5 to 12 carbon atoms such as pentane, hexane, heptane, nonane, decane, and an isomer thereof, an aromatic hydrocarbon solvent such as toluene, and benzene, a hydrocarbon solvent substituted with chlorine such as dichloromethane, and chlorobenzene, or the like, so that the resulting odor may also be reduced.

The polypropylene resin including the homopolypropylene polymer prepared by the polymerization process described above has the large particle size, high fluidity, high crystallization on set temperature, and narrow molecular weight distribution by using the metallocene-based compound having excellent hydrogen reactivity and controlling the amount of hydrogen gas input.

The polypropylene resin including the homopolypropylene polymer prepared in Step 1 may be mixed with an antioxidant. As described above, when used in combination with an antioxidant, it is desirable to prevent changes in physical properties due to heat and shear stress applied during processing into fibers.

At this time, the type and content of the antioxidant are as described above. Also, optionally, at least one additive such as a neutralizing agent, a slip agent, an anti-blocking agent, a UV stabilizer, and an antistatic agent may be further included as described above.

(Step 2)

Subsequently, it is a step of preparing a fiber by performing a melt blowing process using the polypropylene resin prepared in Step 1.

Specifically, the polypropylene resin is melt-spun while injecting air at 240° C. to 270° C. under a pressure of 1.8 psi to 2.3 psi to prepare a fiber.

When preparing a fiber by the melt blowing process, high temperature and high pressure air is injected into the polypropylene composition to be melt-spun. At this time, drawing and opening of the fiber to be produced by spinning occur by the high-temperature and high-pressure process, and fine fibers are provided by adjusting the distance between the die and the collector (DCD).

In the present disclosure, a thin and uniform fiber can be prepared by controlling the temperature and pressure of the injected air along with the characteristic properties of the polypropylene polymer. In addition, it is possible to suppress the occurrence of FLY (resin flying) or NEP (small lumps of fibers) during the melt blowing process.

On the other hand, if the temperature of the injected air is less than 240° C. or the pressure is less than 1.8 psi, a fineness of the prepared fiber increases and a pore size in the fiber increases, so that it is difficult to obtain a sufficient sound-absorbing effect. In addition, if the temperature of the air exceeds 270° C. or the pressure exceeds 2.3 psi, spinning stability decreases and a FLY phenomenon becomes severe, making it difficult to prepare fibers. In the case of using a resin having only a high melt index in the related art, performing the spinning process within the above-described temperature and pressure range caused a problem in that it is difficult to produce ultrafine fibers or a FLY phenomenon inevitably occurs. However, when using a resin satisfying the above-described specific physical properties, such a problem does not occur even with the use of high temperature and high pressure hot air, which is preferable.

In the spinning process, a die to collector distance (DCD) between an extrusion die and a collector is not particularly limited, but may be, for example, 20 cm to 60 cm. When controlling it within the above range, it is possible to further facilitate the production of fine. If the DCD is shorter than 20 cm, the fineness becomes thicker, and if it exceeds 60 cm, spinning stability may be deteriorated and there is a fear that the occurrence of fly may increase.

The fiber prepared according to the above method has an average diameter of about 2.0 µm or less, preferably about 1.3 µm or less, and more preferably about 1.0 µm or less. Ultrafine fibers within the above range can be applied to various fields, and can be used as a sound-absorbing material to achieve an excellent sound-absorbing effect, and in particular, can achieve an excellent sound-absorbing effect even in a high frequency range.

The present invention will be described in more detail with the following examples. However, these examples are for illustrative purposes only, and the invention is not intended to be limited by these examples.

Preparation Example 1: Preparation of Catalyst

After weighing 3 g of silica in a schlenk-flask in advance, 52 mmol of methylaluminoxane (MAO) was added and reacted at 90° C. for 24 hours. After precipitation, the upper layer was removed and washed twice with toluene. Thereafter, 240 pmol of a transition metal compound (1a) having the following structure was dissolved in toluene and added to the reactor, and then reacted at 70° C. for 5 hours. When the reaction was completed and precipitation was completed, the upper layer solution was removed. Thereafter, the remaining reaction product was washed with toluene, washed again with hexane, and dried under vacuum to obtain 5 g of a silica-supported metallocene catalyst in the form of solid particles.

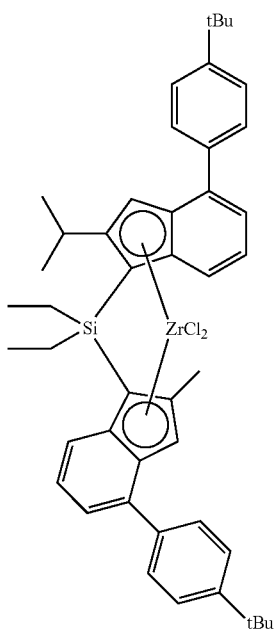

(1a)

Example 1: Preparation of Polypropylene Resin Including Homopolypropylene Polymer A bulk-slurry polymerization of propylene was carried out in the presence of the silica-supported metallocene catalyst prepared in Preparation Example 1 using two continuous loop reactors. At this time, 60 g/h of triethyl aluminum (TEAL) was added using a pump, and 1,200 ppm of hydrogen gas was injected using a pump. The supported catalyst prepared above was used in the form of a mud catalyst mixed with oil and grease at 16 wt %. A homopolypropylene polymer was prepared while maintaining the reactor at 70° C. and the hourly output at 40 kg.

A polypropylene resin was prepared by mixing 0.10 parts by weight of Irganox 1076® (manufactured by BASF) as a phenolic antioxidant based on 100 parts by weight of the homopolypropylene polymer prepared above.

Example 2

A polypropylene resin was prepared in the same manner as in Example 1, except that 1,400 ppm of hydrogen was injected.

Example 3

A polypropylene resin was prepared in the same manner as in Example 1, except that 1,600 ppm of hydrogen was injected.

Comparative Example 1

A polypropylene resin was prepared by using a MF650Y powder-type polypropylene resin (MI 1800) manufactured by Basell, and mixing 0.10 parts by weight of Irganox 1076® (manufactured by BASF) as a phenolic antioxidant based on 100 parts by weight of the above resin.

Comparative Example 2

A polypropylene resin was prepared by using a MF650Z powder-type polypropylene resin (MI 2300) manufactured by Basell, and mixing 0.10 parts by weight of Irganox 1076® (manufactured by BASF) as a phenolic antioxidant based on 100 parts by weight of the above resin.

Experimental Example 1: Evaluation of Physical Properties of Polypropylene Resin Physical properties of the polypropylene resin (the resin is in powder form) used in Examples and Comparative Examples were measured, and the results are shown in Table 2 below.

(1) Average particle diameter (D50): After injecting a sample of the polypropylene resin prepared in one of Examples and Comparative Examples into a hopper of a laser diffraction particle size analyzer (HELOS™ from Symatec), a particle size distribution was measured in the range of 18 μm to 3,500 μm, and the average particle size (D50) was calculated using the result. D50 is the particle size of the resin at 50% of a cumulative distribution of the number of particles according to the particle size of the resin.

(2) Melt index (MI, 2.16 kg, g/10 min): A sample of the polypropylene resin prepared in one of Examples and Comparative Examples was measured at 230° C. with a load of 2.16 kg in accordance with ASTM D1238, and was expressed as the weight (g) of the resin melted for 10 minutes.

(3) Crystallization on set temperature ($T_1$): The complex viscosity (Pa s) of a sample of the polypropylene resin prepared in one of Examples and Comparative Examples was measured while reducing the temperature of the sample from 180° C. at 1° C./min under a shear rate of 1 and the viscosity value at the corresponding temperature was shown in Table 1. Based on the results of Table 1, crystallization on set temperature ($T_1$), which is an initial temperature at a point where a viscosity change ratio becomes 190, was derived according to Equation 1 below.

The complex viscosity was calculated by dynamic frequency sweep at 190° C. using ARES (advanced rheometric expansion system). The dynamic frequency sweep was measured using a disk-shaped 25 mm parallel plate.

$$\text{Viscosity change ratio} = V_2(T_2)/V_1(T_1) \quad \text{[Equation 1]}$$

$V_1(T_1)$ is a complex viscosity measured at a crystallization on set temperature ($T_1$), and $V_2(T_2)$ is a complex viscosity measured at a temperature ($T_2$) 3° C. lower than the crystallization on set temperature ($T_1$).

(4) Melting temperature (Tm, ° C.): A temperature of a sample of the polypropylene resin prepared in one of Examples and Comparative Examples was increased to 200° C., and maintained at that temperature for 5 minutes. After that, the temperature was lowered to 30° C., and further increased. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

(5) Molecular weight distribution (MWD): The molecular weight distribution (MWD) of a sample of the polypropylene resin prepared in one of Examples and Comparative Examples was measured using gel permeation chromatography (GPC). The molecular weight distribution (MDW, i.e., Mw/Mn) was determined by measuring the weight average molecular weight (Mw)

and the number average molecular weight (Mn), and then dividing the measured weight average molecular weight by the number average molecular weight.

Specifically, it was measured using PL-GPC220 instrument manufactured by Waters as a gel permeation chromatography (GPC) device, and a Polymer Laboratories PLgel MIX-B 300 mm long column. At this time, a measurement temperature was 160° C., 1,2,4-trichlorobenzene was used for a solvent and a flow rate was 1 mL/min. And the resin sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol.

TABLE 1

| Viscosity (Pa · s) | Example 1 | Example 2 | Example 3 | Comparative Example 1 | Comparative Example 2 |
|---|---|---|---|---|---|
| 180° C. | 16.12 | 11.05 | 5.73 | 15.72 | 10.65 |
| 150° C. | 29.18 | 19.78 | 10.19 | 28.76 | 19.06 |
| 132° C. | 46.37 | 30.89 | 14.95 | 44.05 | 29.91 |
| 131° C. | 48.15 | 32.03 | 15.92 | 46.11 | 30.46 |
| 130° C. | 50.87 | 33.42 | 16.41 | 47.80 | 31.55 |
| 129° C. | 58.15 | 35.37 | 17.69 | 50.00 | 33.07 |
| 128° C. | 79.87 | 38.92 | 19.14 | 52.59 | 35.42 |
| 127° C. | 380.16 | 84.13 | 44.35 | 56.04 | 37.82 |
| 126° C. | 13484.8 | 1068.89 | 534.45 | 62.70 | 40.82 |
| 125° C. | 17997.2 | 14789.90 | 8490.22 | 136.37 | 85.59 |
| 124° C. | — | — | — | 9780.85 | 6174.55 |
| 123° C. | — | — | — | 12733.5 | 8038.5 |

TABLE 2

| Category | | Average particle diameter (μm) | MI (g/min) | Tm (° C.) | $T_1$ (° C.) | Viscosity change ratio | MWD |
|---|---|---|---|---|---|---|---|
| Experimental Example 1-1 | Example 1 | 1,550 | 1790 | 156 | 129 | 231.9 | 2.22 |
| Experimental Example 1-2 | Example 2 | 1,620 | 2280 | 156 | 128 | 380.0 | 2.22 |
| Experimental Example 1-3 | Example 3 | 1,760 | 3316 | 156 | 128 | 443.6 | 2.22 |
| Comparative Experimental Example 1-1 | Comparative Example 1 | 1,052 | 1850 | 154 | 126 | 203.1 | 2.19 |
| Comparative Experimental Example 1-2 | Comparative Example 2 | 1,112 | 2310 | 154 | 126 | 196.9 | 2.19 |

With the viscosity change data in Table 1, the crystallization on set temperature ($T_1$) of the polypropylene resin was derived.

Referring to Table 2, it was confirmed that the polypropylene resin of the present disclosure had a high melt index and melting point, and also had a large average particle diameter and a high crystallization on set temperature compared to commercially available polymers having a similar melt index.

Experimental Example 2: Evaluation of Spinning Stability of Fiber

Polypropylene fibers were prepared by varying spinning process conditions as shown in Table 3 with the polypropylene resins prepared according to the above Examples and Comparative Examples. Thereafter, physical properties thereof were measured, and the results are shown in Table 3 below.

The FIGURE is a schematic diagram illustrating a melt blown spinning process.

<Spinning Conditions>

The resin was extruded into an ultrafine fiber web by a process similar to that described in the literature [Bresee, R. R. and Qureshi, U. A. "Influence of Processing Conditions on Melt Blown Web Structure. Part 1-DCD, "international Nonwovens Journal, 13(1) 49-55 (2004)].

Specifically, the resin was extruded into an ultrafine fiber web by a process similar to that described in the [Bresee, R. R. and Qureshi, U. A. "Influence of Processing Conditions on Melt Blown Web Structure. Part 1-DCD," International Nonwovens Journal, 13(1) 49-55 (2004)], except that the resin composition was supplied to a melt pump (65 rpm) using a twin screw extruder, and then supplied to a melt blowing die (width of rotating drum collector: 650 cm) having discharging ports (30 holes/inch) with a diameter of 0.3 pi.

Hot Air Pressure (psi): 1.8/2.3
Hot Air Temperature (° C.): 240/270
DCD (Die to Collector Distance, cm): 20/30/60
Weight of non-woven (gsm): 20
(1) Average diameter of fiber
    The diameter of the fiber prepared in Experimental Example 2 was measured for 400 samples, and an average value of the measured values was calculated as the average diameter of the fiber. The results are shown in Table 3 below. For reference, the average diameter of the fiber refers to a diameter of a vertical cross section with respect to a long side of the fiber, and in this case, the diameter of the fiber may be defined as the longest distance among linear distances connecting any two points of a cross section of the fiber.
(2) Spinning stability
    During the preparing process of Experimental Example 2, the spinning stability was evaluated according to the following criteria by visually checking whether FLY, lumps and breakages occurred.

TABLE 3

| Category | | Spinning conditions | | | Average diameter of fiber (μm) | Spinning stability |
|---|---|---|---|---|---|---|
| | | Pressure (psi) | Temperature (° C.) | DCD (cm) | | |
| Experimental Example 2-1-1 | Example 1 | 1.8 | 270 | 30 | 0.91 | ○ |
| Experimental Example 2-1-2 | Example 1 | 2.3 | 240 | 60 | 0.89 | ○ |
| Experimental Example 2-2-1 | Example 2 | 1.8 | 240 | 20 | 0.97 | ○ |
| Experimental Example 2-2-2 | Example 2 | 1.8 | 240 | 30 | 0.80 | ○ |
| Experimental Example 2-2-3 | Example 2 | 2.3 | 270 | 60 | 0.74 | ○ |
| Experimental Example 2-3-1 | Example 3 | 1.8 | 240 | 20 | 0.65 | ○ |
| Experimental Example 2-3-2 | Example 3 | 1.8 | 240 | 30 | 0.51 | ○ |
| Experimental Example 2-3-3 | Example 3 | 2.3 | 270 | 60 | 0.48 | ○ |
| Comparative Experimental Example 2-1-1 | Comparative Example 1 | 1.8 | 240 | 20 | 2.32 | Δ |
| Comparative Experimental Example 2-1-2 | Comparative Example 1 | 1.8 | 270 | 30 | No fibers formed | X |
| Comparative Experimental Example 2-1-3 | Comparative Example 1 | 2.3 | 240 | 60 | No fibers formed | X |
| Comparative Experimental Example 2-2-1 | Comparative Example 2 | 1.8 | 240 | 20 | No fibers formed | X |
| Comparative Experimental Example 2-2-2 | Comparative Example 2 | 1.8 | 240 | 30 | No fibers formed | X |
| Comparative Experimental Example 2-2-3 | Comparative Example 2 | 2.3 | 270 | 60 | No fibers formed | X |
| Comparative Experimental Example 2-3-1 | Comparative Example 3 | 1.8 | 240 | 20 | No fibers formed | X |
| Comparative Experimental Example 2-3-2 | Comparative Example 3 | 1.8 | 240 | 30 | No fibers formed | X |
| Comparative Experimental Example 2-3-3 | Comparative Example 3 | 2.3 | 270 | 60 | No fibers formed | X |

○: No occurrence of FLY, lumps and breakages
Δ: Some FLY occurred
X: FLY, lumps and breakages occurred Referring to Table 3, it was confirmed that the fiber prepared by using the polypropylene resin of the present disclosure was excellent in spinning stability compared to a commercially available resin having a similar melt index when performing a spinning process under the same conditions, and thus, ultrafine fibers of 1 μm or less could be prepared.

In Comparative Experimental Examples using commercially available resins having high melt index, it was confirmed that FLY, lumps, and breakages all occurred when high temperature and high pressure hot air was used, making it difficult to form fibers.

What is claimed is:

1. A polypropylene resin comprising a homopolypropylene polymer and meeting the following conditions of i) to iv):
   i) an average particle diameter is 1,200 μm to 2,500 μm,
   ii) a melt index measured at 230° C. with a load of 2.16 kg in accordance with ASTM D1238 is 1,700 g/10 min to 3,500 g/10 min,
   iii) a crystallization on set temperature ($T_1$) is 127° C. or more, wherein the crystallization on set temperature ($T_1$) is an initial temperature at a point where a viscosity change ratio represented by Equation 1 is 190 or more, Viscosity change ratio=$V_2(T_2)/V_1(T_1)$ [Equation 1]

In Equation, $V_1(T_1)$ and $V_2(T_2)$ are complex viscosities (Pa·s) measured at $T_1$ and $T_2$, respectively, while reducing the temperature of a polypropylene resin from 180° C. at 1° C./min under a shear rate of 1 s$^{-1}$,
   $T_1$ is a crystallization on set temperature, and
   $T_2$ is a temperature 3° C. lower than the crystallization on set temperature ($T_1$),
   wherein the complex viscosities are measured using advanced rheometric expansion system (ARES), and
   iv) a molecular weight distribution is 2.2 to 2.4.

2. The polypropylene resin of claim 1,
   wherein a viscosity change ratio of a viscosity $V'_2(T_2)$ measured at a temperature 3° C. lower than a crystallization on set temperature ($T_1$) to a viscosity $V'_1(T_1)$ measured at the crystallization on set temperature ($T_1$) derived according to the Equation 1 is 220 to 450.

3. The polypropylene resin of claim 1,
wherein the crystallization on set temperature ($T_1$) is 127° C. to 130° C.

4. The polypropylene resin of claim 1,
wherein the $V_2(T_2)$ is 8,300 Pa·s to 20,000 Pa#s.

5. The polypropylene resin of claim 1,
wherein the resin has a complex viscosity measured at 126° C. of 500 Pa·s or more.

6. The polypropylene resin of claim 1,
wherein the resin has a complex viscosity measured at 125° C. of 8,000 Pa·s or more.

7. The polypropylene resin of claim 1,
wherein the resin has a melting point of 155° C. or more.

8. The polypropylene resin of claim 1,
wherein the resin is in powder form.

9. A polypropylene fiber comprising the polypropylene resin according to claim 1.

10. The polypropylene fiber of claim 9,
wherein the polypropylene fiber has an average diameter of 2.0 μm or less.

* * * * *